US007768393B2

(12) United States Patent
Nigam

(10) Patent No.: US 7,768,393 B2
(45) Date of Patent: Aug. 3, 2010

(54) SYSTEM AND METHOD FOR ASSET TRACKING

(75) Inventor: Amit Nigam, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 445 days.

(21) Appl. No.: 11/784,904

(22) Filed: Apr. 10, 2007

(65) Prior Publication Data

US 2008/0252431 A1 Oct. 16, 2008

(51) Int. Cl.
*G08B 1/08* (2006.01)
*G01S 3/02* (2006.01)

(52) U.S. Cl. .................. 340/539.13; 342/457; 701/216; 701/217; 701/220; 340/988

(58) Field of Classification Search .... 340/539–539.17, 340/426.1, 462.19, 825.49, 988; 342/457, 342/357; 701/216, 217, 220
See application file for complete search history.

(56) References Cited

U.S. PATENT DOCUMENTS

| | | | | |
|---|---|---|---|---|
| 4,177,466 | A * | 12/1979 | Reagan | 342/456 |
| 4,831,563 | A * | 5/1989 | Ando et al. | 702/93 |
| 5,311,197 | A * | 5/1994 | Sorden et al. | 342/457 |
| 5,917,423 | A | 6/1999 | Duvall | 340/825.37 |
| 5,959,568 | A * | 9/1999 | Woolley | 342/42 |
| 6,098,005 | A * | 8/2000 | Tsukamoto et al. | 701/65 |
| 6,289,278 | B1 * | 9/2001 | Endo et al. | 701/208 |
| 6,392,565 | B1 | 5/2002 | Brown | 340/988 |
| 6,611,229 | B2 | 8/2003 | Muramatsu et al. | 342/357.07 |
| 6,847,825 | B1 | 1/2005 | Duvall et al. | 455/456.3 |
| 6,876,858 | B1 | 4/2005 | Duvall et al. | 455/456.1 |
| 6,898,514 | B2 | 5/2005 | Iijima | 701/200 |
| 7,050,907 | B1 * | 5/2006 | Janky et al. | 701/213 |
| 7,106,211 | B2 | 9/2006 | Duvall | 340/902 |
| 7,171,187 | B2 * | 1/2007 | Haave et al. | 455/404.2 |
| 7,215,254 | B2 * | 5/2007 | Tauchi | 340/903 |
| 7,552,467 | B2 * | 6/2009 | Lindsay | 726/5 |
| 2003/0210143 | A1 * | 11/2003 | Haddad | 340/539.13 |
| 2004/0153241 | A1 * | 8/2004 | Suzuki | 701/211 |

(Continued)

FOREIGN PATENT DOCUMENTS

DE 10238805 A1 3/2004

(Continued)

OTHER PUBLICATIONS

Sony's GPS Receiver Module, Development of GPS Receiver-Based Product for Automobiles, Sony Electronics.

*Primary Examiner*—Benjamin C Lee
*Assistant Examiner*—Sigmund Tang

(57) ABSTRACT

A system and method for asset tracking utilizing a wireless device. An asset such as a vehicle can be equipped with a 3-axis geomagnetic sensor and an accelerometer in association with a remote control hardware component capable of responding to SMS (Short Message Service) command transmitted from the wireless device. As soon as the theft of the asset is detected, a "Theft in progress" SMS data can be transmitted from the wireless device to the remote device attached to the asset. The device then queries the geomagnetic sensor and the accelerometer at a pre-defined rate and transmits the X-Y-Z coordinates and acceleration values to the cell phone/computer via SMS at regular intervals. The device can also log the route of vehicle in a non-volatile memory which can be queried utilizing a "Request History" command.

20 Claims, 3 Drawing Sheets

U.S. PATENT DOCUMENTS

| | | | | |
|---|---|---|---|---|
| 2004/0181335 | A1* | 9/2004 | Kim et al. | 701/207 |
| 2004/0198309 | A1 | 10/2004 | Duvall | 455/404.1 |
| 2004/0233068 | A1 | 11/2004 | Duvall | 340/988 |
| 2006/0007039 | A1 | 1/2006 | Duvall | 342/357.08 |
| 2007/0027583 | A1 | 2/2007 | Tamir et al. | |

FOREIGN PATENT DOCUMENTS

| | | | |
|---|---|---|---|
| EP | 1484731 | B1 | 12/2004 |
| EP | 1771017 | A2 | 4/2007 |
| EP | 1 759 943 | * | 7/2007 |
| FR | 2785112 | A1 | 4/2000 |
| WO | WO 00/50916 | A1 | 8/2000 |
| WO | WO 01/58730 | A1 | 8/2001 |
| WO | WO 2004/103783 | A1 | 12/2004 |

* cited by examiner

SYSTEM AND METHOD FOR ASSET TRACKING

TECHNICAL FIELD

Embodiments are generally related to data-processing systems and methods. Embodiments are also related to wireless devices, networks and systems. Embodiments are additionally related to systems and methods for asset tracking and theft prevention.

BACKGROUND OF THE INVENTION

A vehicle tracking systems is an electronic device installed in vehicles to enable vehicle owners or third parties to track the location of a vehicle. Most modern vehicle tracking systems utilize GPS (Global Positioning Satellite) modules that allow for the easy and accurate location of a vehicle equipped with such a device. Many systems also combine communication components such as cellular or satellite transmitters to communicate the vehicle's location to a remote user. Vehicle information can be viewed utilizing electronic maps via the Internet and/or specialized software.

Vehicle tracking systems have their roots in the shipping industry. Corporations with large fleets of vehicles required some sort of system to determine the location of each vehicle at any given time. Vehicle tracking systems can also be found in consumers vehicles as a theft prevention and retrieval device. Police can simply follow the signal emitted by the tracking system and locate the stolen vehicle.

Many vehicle tracking systems utilize GPS or a form of AVL (Automatic Vehicle Location) to allow for the location of the vehicle. Terrestrial based systems such as LORAN (LOng RAnge Navigation) and LoJack™ tracking units utilize radio frequency (RF) transmitters which can transmit through walls, garages, or buildings. Note that "LoJack" is a trademark of the LoJack Corporation. Many police cruisers around the world have a form of AVL tracking as standard equipment in their vehicles.

The well-known LoJack™ System includes a radio frequency transceiver embedded in a vehicle. Each LoJack™ System includes the use of a unique code that can be tied into the VIN (Vehicle Identification Number). When a theft is reported to the police, a routine entry in the state police crime computer results in a match of the LoJack™ System's unique code against the state VIN database. This activates the LoJack™ System in the car, which emits an inaudible signal. Law enforcement authorities who are equipped with LoJack™ vehicle tracking units in their police cruisers and aviation units can then listen for a LoJack™ signal. Police utilize the LoJack™ vehicle tracking units to track and recover LoJack™ equipped vehicles.

The LoJack™ System offers a GPS-based solution that depends on the law-enforcement department's ability to locate the subject by intercepting signals from a GPS satellite. Most of the existing systems do not function in all countries as they require close collaboration with local law-enforcement agencies. Further, many systems require additional subscription and installation charges and are not cost effective for low-cost automobiles. Such systems depend on an agency for tracking the vehicle.

In the case of a vehicle theft, unless the vehicle is equipped with a GPS device, tracking down the vehicle can be a long and often inconclusive process. Therefore, a need exists to provide an easy, low cost and extremely useful tracking system without relying on GPS-based devices or systems such as the LoJack™ based devices, which are expensive and not cost-effective for the majority of vehicle owners, who cannot or afford or do not own expensive automobiles.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved system and method for assert tracking.

It is another aspect of the present invention to provide for a system and method for tracking automobiles utilizing a wireless communications device, such as a mobile phone.

The aforementioned aspects and other objectives and advantages can now be achieved as described herein. An asset tracking system and method are disclosed. An asset, such as a vehicle, can be equipped with a 3-axis geomagnetic sensor and an accelerometer in association with a remote control hardware that can respond to a command sent in the form of SMS (Short Message Service) data transmitted from a wireless device such as a mobile phone. As soon as a theft of the asset is detected, a "Theft in progress" SMS transmission can be sent to a remote device attached to the vehicle. The device then queries the geomagnetic sensor and accelerometer at a pre-defined rate and transmits the X-Y-Z coordinates and acceleration values to the preconfigured mobile phone/computer/SMS terminal via SMS at regular intervals. The device can also log the route in a non-volatile memory which can be queried utilizing a "Request History" command.

The system and method described herein can be cost effective because the tracking system is not GPS based. The disclosed embodiments do not mandate involvement of a third party (e.g., law-enforcement agencies) for tracking the asset. Such a solution can utilize the existing infrastructure to achieve its objective.

The user can directly query the asset and report the theft of the asset along with its calculated location. The user can thus track the stolen asset/vehicle him/herself immediately for speedy recovery. The disclosed embodiments also provide the location of the vehicle and predict a future course based on directional data obtained from a 3-axis acceleration sensor while also permitting continued tracking of the vehicle route. Furthermore, such embodiments do no require a subscription service and being low-cost, can therefore easily reach a mass market in less time and find their usage in a wide-variety of applications.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
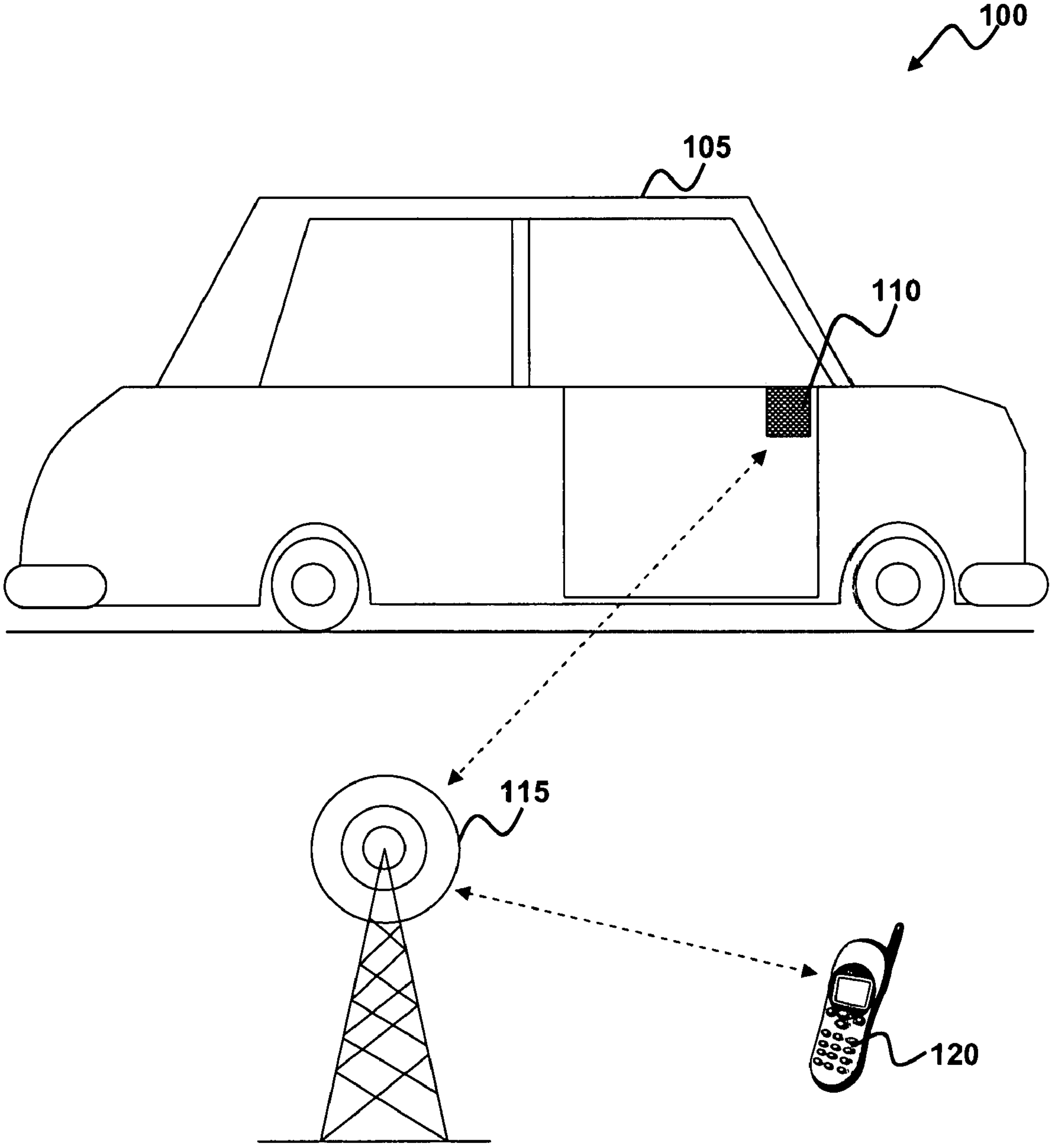
FIG. 1 illustrates a schematic view of an automobile tracking system, which can be implemented in accordance with a preferred embodiment.

FIG. 1 illustrates a schematic view of an automobile tracking system 100, which can be implemented in accordance with a preferred embodiment. A remote tracking device 110 can be installed in a vehicle or automobile 105. An SMS (Short Message Service) from a mobile phone 120 can be sent to the remote tracking device 110 via a transmission tower 115. The remote tracking device 110 provides location and movement information of the vehicle 110 to the mobile phone 120 at a pre-defined rate via the transmission tower 115. The SMS can also be sent from a computer (not shown).

SMS or "Short Message Service" is a service available on most digital mobile phones, other mobile devices (e.g. a Pocket PC, or occasionally even desktop computers) and some fixed phones, that permits the sending of short messages between mobile phones, other handheld devices and even landline telephones. The terms text messaging, text messages, more colloquially SMSes, texts, or even txts and its variants are more commonly used in North America, the UK, Spain and the Philippines, while most other countries prefer the term SMS. SMS data can also be referred to as "textual data". Text messages are also often used to interact with automated systems, such as ordering products and services for mobile phones, or participating in contests. There are many services available on the Internet that allow users to send text messages free of charge.

Figure 2:
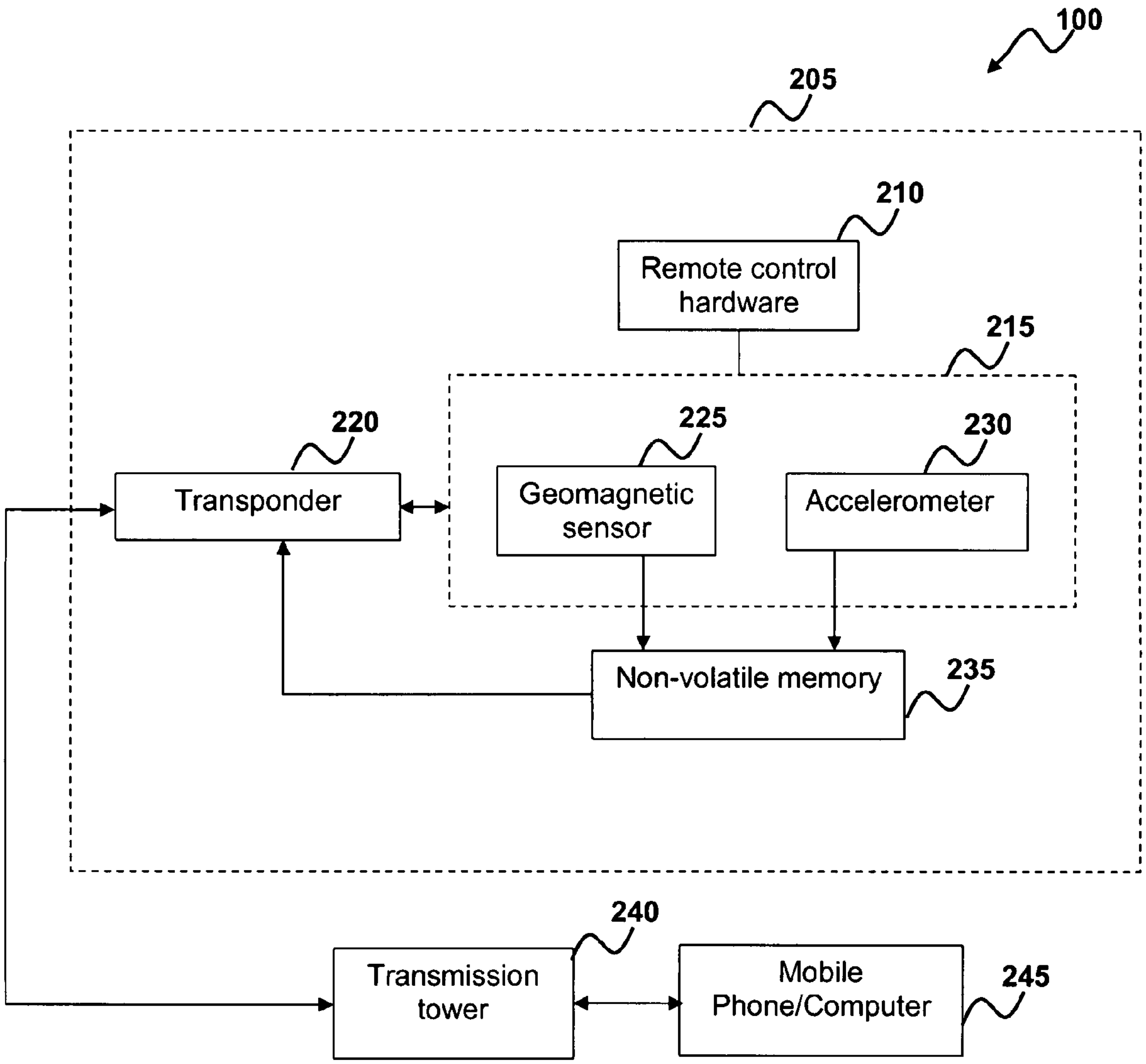
FIG. 2 illustrates a block diagram of an automobile tracking system, which can be implemented in accordance with an alternative embodiment.

FIG. 2 illustrates a block diagram of an automobile tracking system 100, which can be implemented in accordance with an alternative embodiment. Note that in FIG. 1 and FIG. 2, identical or similar parts or elements are indicated by identical reference numerals. Thus, FIG. 2 also contains the remote tracking device 110, transmission tower 115 and the mobile phone or computer 120. The remote tracking device 110 installed in the vehicle 105 depicted in FIG. 1 comprises a transponder 220, remote control hardware 210, a combinational sensor 215 and a non-volatile memory 235.

In telecommunication, the term transponder 220 (short-for Transmitter-responder) represents a receiver-transmitter that can generate a reply signal upon proper electronic interrogation. The combinational sensor can include a geomagnetic sensor 225 and an accelerator 230. The accelerometer 230 is a device for measuring acceleration. The accelerometer 230 inherently measures its own motion (i.e., locomotion), in contrast to a device based on remote sensing. The geomagnetic sensor 225 is an instrument for measuring the intensity and direction of a geomagnetic field which human beings can not sense. Note that the accelerometer 230 can be implemented as a MEMS (Micro Electro Mechanical System) based acceleration sensing device.

As soon as the theft is detected, a "Theft in progress" SMS can be sent to the remote tracking device 110 attached to the vehicle 105. The transponder 220 queries the geomagnetic sensor 225 and accelerometer 230 at a pre-configured rate for coordinate and acceleration values. The X-Y-Z coordinates and acceleration values can then be sent to the mobile phone/computer 120 as SMS at regular intervals. The remote control hardware 210 with combinational sensor 215 can be capable of responding with SMS from the mobile phone 120. The geomagnetic sensor 225 can be provided as a 3-axis geomagnetic sensor.

The information received as SMS from the tracking device 110 assists the user not only in determining the current location of the asset, but also to make predictions about the asset's course in the near future. In addition, the transponder 220 also logs coordinates, which can be utilized later to track the entire course of journey. The device 110 can also log the route in a non-volatile memory 235, which can be queried utilizing a "Request History" command.

Figure 3:
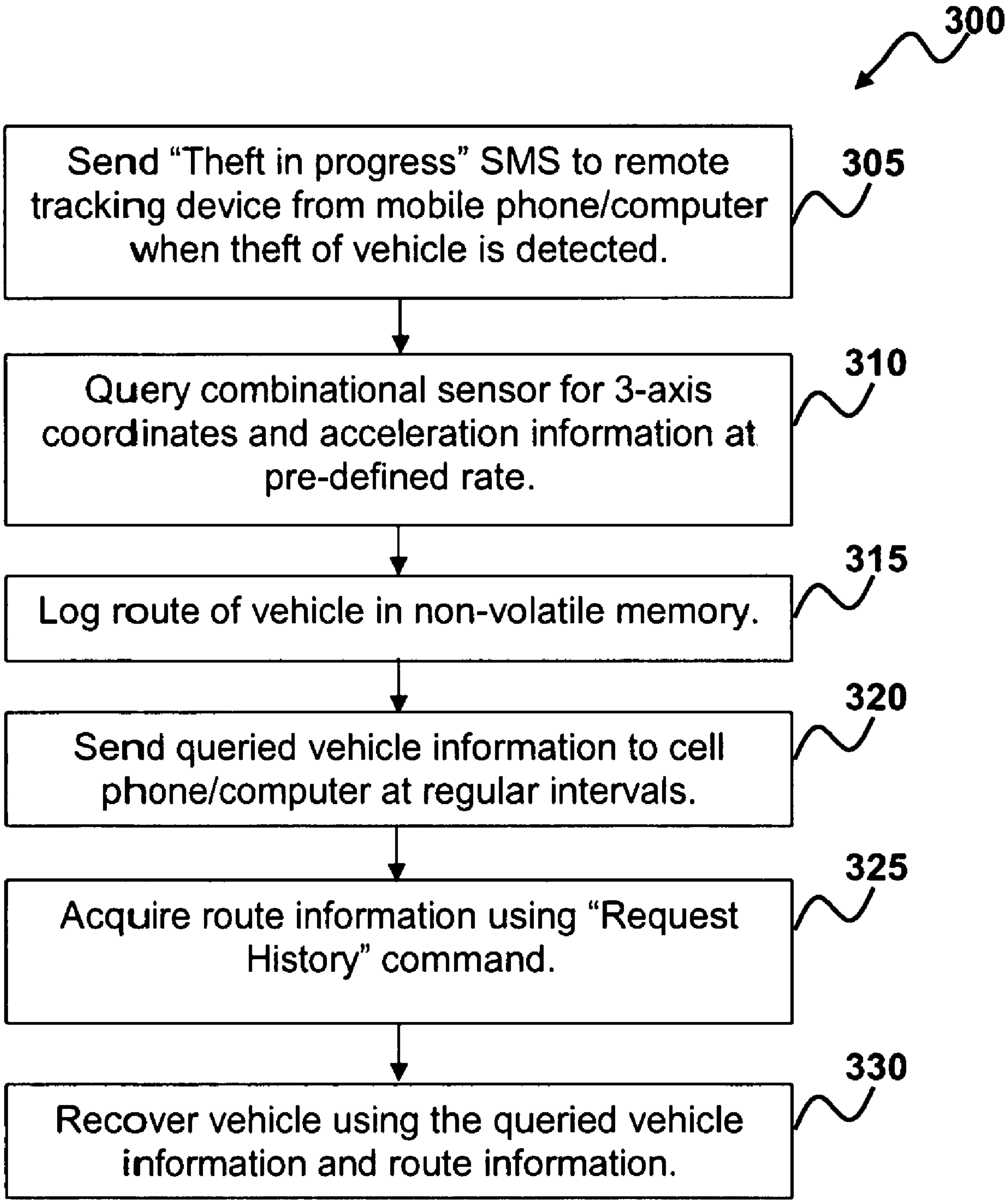
FIG. 3 illustrates a high level flow chart of operations depicting logical operational steps of a method for automobile tracking, in accordance with an alternative embodiment.

FIG. 3 illustrates a high level flow chart of operations depicting logical operational steps of a method 300 automobile tracking, which can be implemented in accordance with an alternative embodiment. As indicated at block 305, a "Theft in progress" SMS can be transmitted to the remote tracking device 110 from the mobile phone/computer 120 when the theft of the asset or vehicle 105 is detected. The 3-axis coordinates and acceleration information can be the obtained at a pre-defined rate from the combinational sensor 215 as indicated at block 310. Next, as illustrated at block 315, the device 110 can log the route of the vehicle 105 in a non-volatile memory associated with a data-processing apparatus or system. The log can be queried for route history utilizing a "Request History" command. The 3-axis coordinate data and acceleration data can be transmitted to the mobile phone or computer 245 depicted in FIG. 2 at regular intervals. The route history can be obtained utilizing a "Request History" command as depicted at block 325. Finally, as illustrated at block 330, the vehicle can be recovered utilizing the route history, 3-axis coordinate data and acceleration data. An extension of this concept is the ability to have the maps uploaded to a pocket pc or mobile phone and have the route information superimposed on a display screen of such mobile computing/wireless communications device. Such a feature can assist in identifying the actual location of the asset.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for asset tracking, comprising:

transmitting textual data from a user terminal to a remote tracking device of an asset indicating that a theft of said asset is in progress;

respectively compiling coordinate data and acceleration data of said asset from a geomagnetic sensor and an accelerometer associated with said remote tracking device; and transmitting said coordinate data and said acceleration data from said remote tracking device to said user terminal to provide location information of the asset.

2. The method of claim 1 further comprising:

storing said coordinate data and acceleration data of said asset in a memory of the remote tracking device to define a route;

querying said memory of said remote tracking device with said user terminal for said route of said asset using a particular command.

3. The method of claim 1 wherein respectively compiling said coordinate data and said acceleration data of said asset, further comprises:

respectively querying said geomagnetic sensor and said accelerometer for said coordinate data and said acceleration data of said asset at a pre-determined rate; and transmitting said coordinate data and said acceleration data of said asset to said user terminal at regular or substantially regular intervals.

4. The method of claim 1 wherein said asset comprises a vehicle.

5. The method of claim 1 wherein said textual data comprises SMS (Short Message Service) data.

6. The method of claim 1 wherein said user terminal comprises a mobile phone, PDA or a combination thereof.

7. The method of claim 1 wherein said user terminal comprises a computer.

8. The method of claim 1 wherein said geomagnetic sensor and said accelerometer together define, at least in part, a combinational sensor.

9. The method of claim 1 wherein said geomagnetic sensor comprises a 3-axis geomagnetic sensor and said coordinate data comprises X-Y-Z coordinate data.

10. The method of claim 2 wherein said memory comprises a non-volatile memory.

11. A method for asset tracking, comprising:

transmitting SMS (Short Message Service) data from a user terminal to a remote tracking device of an asset in response to an event;

after the remote tracking device receives the SMS data, sensing coordinate data and acceleration data of said asset with a geomagnetic sensor and an accelerometer associated with said asset;

storing said sensed coordinate data and acceleration data over a period of time in a memory of said remote tracking device to define a route of said asset;

transmitting said route of said asset stored in said memory of said remote tracking device to said user terminal.

12. A system for asset tracking, comprising:

an asset including a tracking device;

a user terminal located remote of said tracking device and said asset, wherein said user terminal is configured to transmit textual data to said tracking device in response to a user's detection of a theft of said asset in order to activate said tracking device; and wherein said tracking device includes a geomagnetic sensor and an accelerometer, wherein said geomagnetic sensor and said accelerometer are configured to compile coordinate data and acceleration data associated with said asset when activated by said tracking device, wherein said tracking device is configured to transmit said coordinate data and said acceleration data in response to receiving a predefined textual data command from said user terminal.

13. The system of claim 12 wherein said tracking device further includes a memory for recording said coordinate data and said acceleration data to define a route of said asset, wherein said tracking device is configured to query said memory for said route upon receiving a route command from said user terminal.

14. The system of claim 12 wherein:

said tracking device is configured to query said geomagnetic sensor and said accelerometer for said coordinate data and said acceleration data of said asset at a predetermined rate; and said tracking device is configured to transmit said coordinate data and said acceleration data of said asset to said user terminal at regular intervals.

15. The system of claim 12 wherein said asset comprises a vehicle.

16. The system of claim 12 wherein said textual data comprises SMS (Short Message Service) data.

17. The system of claim 12 wherein said user terminal comprises a mobile phone.

18. The system of claim 12 wherein said user terminal comprises a computer.

19. The system of claim 12 wherein said geomagnetic sensor and said accelerometer from a combinational sensor.

20. The system of claim 12 wherein said geomagnetic sensor comprises a 3-axis geomagnetic sensor and said coordinate data comprises X-Y-Z coordinate data.

* * * * *